United States Patent
Ruffner et al.

(10) Patent No.: US 8,949,239 B2
(45) Date of Patent: Feb. 3, 2015

(54) METHODS AND SYSTEMS FOR UTILIZING ACTIVITY DATA WITH CLUSTERED EVENTS

(75) Inventors: Jennifer Granito Ruffner, San Francisco, CA (US); Eishay Smith, Cupertino, CA (US); Joseph Paul Betz, Mountain View, CA (US); Ian McCarthy, Menlo Park, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/010,663

(22) Filed: Jan. 20, 2011

(65) Prior Publication Data

US 2012/0191715 A1    Jul. 26, 2012

(51) Int. Cl.
*G06F 17/30* (2006.01)

(52) U.S. Cl.
CPC .............................. *G06F 17/30867* (2013.01)
USPC ........................................................ 707/738

(58) Field of Classification Search
USPC ................... 707/708, 710, 737, 738
See application file for complete search history.

(56) References Cited

U.S. PATENT DOCUMENTS

| | | | |
|---|---|---|---|
| 6,253,202 B1 * | 6/2001 | Gilmour ............................ 1/1 |
| 7,925,743 B2 * | 4/2011 | Neely et al. .................... 709/224 |
| 8,307,066 B2 * | 11/2012 | Carter et al. ................... 709/224 |
| 8,402,023 B2 * | 3/2013 | Sheehan et al. ............... 707/728 |
| 2006/0224675 A1 * | 10/2006 | Fox et al. ........................ 709/206 |
| 2007/0198506 A1 * | 8/2007 | Attaran Rezaei et al. ........ 707/5 |
| 2007/0203996 A1 * | 8/2007 | Davitz et al. ................... 709/206 |
| 2007/0208719 A1 * | 9/2007 | Tran .................................. 707/3 |
| 2008/0177834 A1 * | 7/2008 | Gruhl et al. .................... 709/204 |
| 2009/0070219 A1 * | 3/2009 | D'Angelo et al. .............. 705/14 |
| 2009/0094233 A1 * | 4/2009 | Marvit et al. ..................... 707/5 |
| 2009/0319288 A1 * | 12/2009 | Slaney et al. ..................... 705/1 |
| 2010/0049534 A1 * | 2/2010 | Whitnah et al. .................. 705/1 |
| 2010/0324990 A1 * | 12/2010 | D'Angelo et al. ......... 705/14.46 |
| 2011/0016121 A1 * | 1/2011 | Sambrani et al. .............. 707/734 |
| 2011/0167054 A1 * | 7/2011 | Bailey et al. ................... 707/710 |
| 2012/0059822 A1 * | 3/2012 | Malandain et al. ........... 707/736 |
| 2012/0084160 A1 * | 4/2012 | Badros et al. .............. 705/14.73 |
| 2012/0109830 A1 * | 5/2012 | Vogel .............................. 705/75 |

* cited by examiner

*Primary Examiner* — Cam-Linh Nguyen
(74) *Attorney, Agent, or Firm* — Schwegman Lundberg & Woessner, P.A.

(57) ABSTRACT

The present disclosure relates to methods and systems for clustering individual items of web content, and then utilizing activity and profile data to both select clusters of content items for presentation to a user, and determining how the selected clusters of content items are presented to the user of an online social network service. With some embodiments, the activity data are derived by monitoring and detection interactions with the individual items of web content by an individual user, or other users with whom the individual user is related, as established via, and defined by, the social network service.

23 Claims, 7 Drawing Sheets

METHODS AND SYSTEMS FOR UTILIZING ACTIVITY DATA WITH CLUSTERED EVENTS

TECHNICAL FIELD

The present disclosure generally relates to processing and presenting web content within an online social networking environment. More specifically, the present disclosure relates to methods and systems for clustering individual items of web content, and then utilizing user activity and profile data, in combination with a user's social network data, to both select clusters of content items for presentation to a user, and determine how the selected clusters of content items are presented to the user of an online social network.

BACKGROUND

A social network service is a computer- or web-based application that enables users to establish links or connections with persons for the purpose of sharing information with one another. In general, a social network service enables people to memorialize or acknowledge the relationships that exist in their "offline" (i.e., real-world) lives by establishing a computer-based representation of these same relationships in the "online" world. With a social networking site or service, a user may have many options for sharing information with others. For example, a user may communicate a private message to a single user, for example, by directing an email to the user, or by posting the message to a web page only accessible to the recipient. In addition to sharing user-generated content, a social networking user may share information by sharing a link (e.g., a hyperlink or Uniform Resource Locator (URL)), directing the recipient to an external content source, such as a blog site, news site, or an audio or video clip of potential interest to the recipient. In addition to enabling one-to-one sharing, many social network services make it easy to share information with multiple users, including groups. For example, some social network services enable a user to post a message to, or share a link with, all users or some predefined set of users. With some social networks, users can self-organize into groups, such that like-minded individuals, or individuals with a common interest, can become members of the same group for purposes of sharing information and communicating with one another.

As users of social network services become more accustomed to interacting with and via the services, and as users become accustomed to sharing more personal information using the services, the services have access to greater amounts of more personal user information. Consequently, opportunities exist to improve and enrich the overall experience by presenting to users the right mix of information at the right time.

DESCRIPTION OF THE DRAWINGS

Some embodiments are illustrated by way of example and not limitation in the figures of the accompanying drawings, in which.

DETAILED DESCRIPTION

Figure 1:
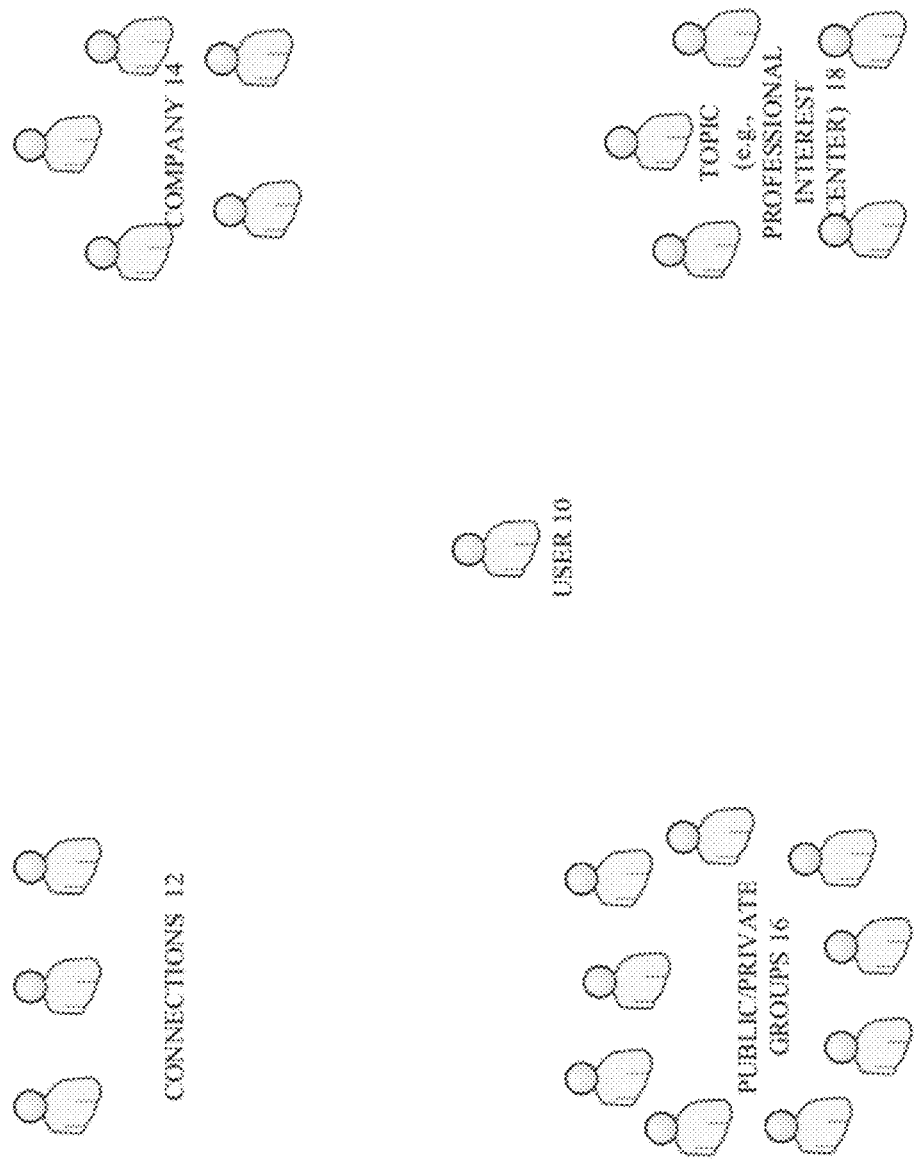
FIG. 1 shows some of the many relationships that an individual user of a social network service may have with other users and entities (e.g., groups, companies, topics, keywords, etc.) of the social network service consistent with some embodiments of the invention.

Methods and systems for clustering individual items of web content, and then utilizing user activity and profile data, in combination with social network data, to select clusters of web content items for presentation to users of an online social network are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

For purposes of the present disclosure, an item of web content is meant to broadly encompass, as the name suggests, any individual item or unit of textual, visual, or aural content that may be processed, rendered and presented as part of the user experience with a website. In particular, the term "web content" is meant to encompass web documents and web pages, where a web document is defined more broadly than a web page and the two can be distinguished by at least some of the following characteristics. Whereas a web page is formatted in HTML (Hypertext Markup Language) or XTML (eXtensible Hypertext Markup Language) and transferred using HTTP (Hypertext Transfer Protocol) or HTTPS (HTTP Secure), web documents are formatted with HTML, XHTML, or any other type of valid MIME Content-Type, such as an ISO OpenDocument, and transferred with HTTP, HTTPS, or any other Internet communication protocol. Additionally, a web page is traditionally displayed and viewed via a conventional web browser application, whereas a web document may be displayed or viewed within a web browser or any other MIME-compatible application, to include any number and variety of desktop, mobile or tablet-based applications.

Consistent with some embodiments of the invention, using the various methodologies described herein, a social network service analyzes web documents relating to news stories or news events, to generate clusters of web documents based on unique news stories and/or events. By monitoring and detecting how various users interact with the web documents, the social network service attempts to present or recommend the cluster of web documents related to the news stories and/or events that are most likely to be of interest to a particular user. As such, the many illustrated examples presented herein refer to web documents, and more particularly, web documents associated with news stories and events. However, a great number and variety of other items of web content are equally applicable to the inventive subject matter. For instance, other examples of web content items with which the invention may be utilized include, but are not limited to: web pages, text, messages, tweets, photographs, graphics, videos content, and audio content. Furthermore, for purposes of the present disclosure, a "user" of a social network service is meant to include both registered users—such as those who have registered with a service and have obtained authentication information (e.g., username/email address and password)—and, unregistered users or guests to the social networking service site.

Furthermore, many of the examples described herein are provided in the context of a business networking service (e.g., an online social network service specifically aimed at business users), such as that operated by LinkedIn, Inc. of Palo Alto, Calif. However, the inventive concepts are equally applicable to a variety of online or computer-based social network services. Moreover, as used herein, the terms, "social network," "social networking site," and "social network service" are meant to include both social networks—with which users generally establish connections with friends and family—and, business or professional networks, with which users generally establish connections with their professional contacts.

In general, and consistent with embodiments of the invention, in the context of a social network service a connection or link represents, or is otherwise associated with, an information access privilege, such that a first user of a social network service who has established a connection with a second user is, via the establishment of that connection, authorizing the second person to view or access certain personal information, such as contact information or other information that may be part of a user's profile (e.g., phone numbers, an address, employment information, photographs, status information, educational background information, shared links, tweets, and so on). Those users of the social network service who are not connected to the first user may or may not be permitted or authorized to access or view the first user's personal information. In some embodiments, users may become members of groups—that is, self-organized groups, based on a common interest—such that each member of the group authorizes a certain access privilege for certain information to other members of the same group. Of course, depending on the particular implementation of the social network service, the nature and type of the information that may be shared, as well as the granularity with which the access privileges may be defined to protect certain types of data can vary greatly.

In addition to establishing connections with other users, with some embodiments of the invention a user may subscribe to or "follow" another user, a company, or a topic (e.g., a particular subject matter). Whereas a direct connection between two users typically requires that both users acknowledge or authorize the establishment of the connection, and information is shared two ways, following another user is typically a unilateral action, such that information only flows in one direction—from the person being followed, to the follower. By requesting to follow another user, company or topic, the follower will be notified of certain activities and events undertaken by, or otherwise associated with the user, company or topic being followed. For example, if a first user is following a second user, when the second user comments on a particular news story, the first user may be notified of the comment and provided with a link to the web document representing the news story on which the second user commented. Similarly, the social network service may detect when a user performs a search using certain keywords, and then associate these keywords with the user, such that the relationship between the user and the keywords can be used to identify content of potential interest to the user.

In addition to simply facilitating communication between users, some social network services attempt to recommend to users individual items of content (e.g., a news story) based on some explicit, or implicit, expression of interest by the users. For instance, a social networking user may indicate that she is interested in certain topics, for example, by checking a box corresponding with topics of interest, or otherwise indicating or selecting topics of interest. Accordingly, the social network service may recommend that the user view certain content that is deemed to have subject matter consistent with a particular topic. In some instances, rather than recommending content based on an explicit expression of interest, a social network service may recommend content based on some implicit expression of interest. For example, a social network service may detect and analyze content items that a particular user is accessing (either internally, at the social network service, or externally, at a third-party service), and based on the analysis, recommend other content deemed to be similar to the content being accessed by the user. However, in many instances, the algorithms and mechanisms by which social network services recommend content to users leaves much to be desired.

As will be described in greater detail below, clusters of web documents are assigned ranking scores on a per user basis, based at least in part on how a user interacts with various web documents, and how other users with whom the user is related (e.g., directly connected to, followed by, following, indirectly related to another by similar or same title in same industry, and so forth) interact with the web documents. Accordingly, consistent with some embodiments of the invention, a social network service generates a number of clusters of web documents. For example, each cluster of web documents may include web documents representing news stories determined to be associated with a particular news event. The social network service monitors and detects when, and how, users of the social network service are interacting with the various web documents, for example, by reading a web document, by submitting a web document via the social network service, by sharing a web document with another user or group, by commenting on a particular web document, or by "liking" a web document.

Then, for each user, the clusters of web documents are assigned ranking scores based on an analysis of the various interactions that the user, and the users with whom the user is related (directly, or by group, or some other affiliation), have with the web documents, such that each ranking score for a cluster represents a measure of the likelihood that a particular user would be interested in a web document from the particular cluster. In particular, the cluster ranking scores for a particular user are based on detecting when the user interacts with various web documents, and when other users with whom the user is related interact with the web documents. Additionally, other relationship information may be considered when deriving a ranking score. For instance, a relationship between a cluster and a user may be ascertained by analyzing some aspect of a user's profile information, such as, the user's employment history, educational background, professional certifications and honors, and so forth.

With some embodiments, the particular activities that are monitored and detected are those activities that occur via interactions with the social network service. However, in some embodiments, in addition to interactions that occur via the social network, other interactions that occur outside of the social network system are also analyzed. For instance, the social network service may have access to data that is generated by one or more third-party services, such that the data may be accessed periodically, or in real-time, via an application programming interface (API). In some instances, a formal agreement will be in place between the social network service and the third party, such that the third party will have previously agreed to share data with the social network service. In other instances, the social network service may have one or more automated processes for "scraping" data from a third-party service. In any case, some embodiments utilize both data derived from internally detecting certain interactions, as well as data derived from external data sources, where such data is used to assess the likelihood that a user will be interested in a certain cluster of articles, associated with certain topics.

With some embodiments, the social network service will monitor when a particular web document or cluster of web documents is generating negative feedback, for example, by receiving a lot of impressions, but generating relatively few clicks or engagements. In such a scenario, the web document or cluster may not be popular, and therefore should not be prominently presented.

By way of example, if a first user is a direct connection (e.g., a friend or personal contact) of a second user, and the second user reads a particular web document related to a news event, the ranking score for the cluster to which the web document is assigned will be increased to reflect the possibility that the first user may be interested in the news event. Once the clusters are generated and assigned ranking scores, users are presented with personalized content. For instance, the social network service may customize a particular web page for a particular user to show links to those web documents related to news stories associated with the cluster having the highest ranking score for the user. Furthermore, the selection of document clusters may be tailored to the particular application or section of the social network website that the user is viewing. For instance, if a user is viewing his or her personalized home page for the entire site, the particular cluster or clusters of web documents that may be recommended to the user may differ from the recommendations that the user would see if the user was viewing a web page associated with a particular group or company to which the user belongs, or follows. Accordingly, at least with some embodiments, the algorithm for selecting the particular cluster or clusters of web documents to recommend to a user takes into consideration not only the relative ranking scores of each cluster of web documents, but also the context in which the recommendation is being provided. Other aspects and advantages of the present invention will be apparent to one skilled in the art from the description of the figures that follows.

FIG. 1 shows some of the many relationships that an individual user 10 of a social network service may have with other users of the social network service, consistent with some embodiments of the invention. For instance, a user 10 may be directly connected with one or more other users, as illustrated by the users labeled as "Connections" in FIG. 1, with reference number 12. With some embodiments, a first-level connection is a person with whom a user has directly connected, whereas a second-level connection is a person connected to the individual user 10 by way of a first-level connection—for example, a concept that is frequently referred to as a friend-of-a-friend. In various embodiments, the interactions that an individual user's connections have with various web documents will affect the ranking scores of the clusters of web documents for the individual user 10, thereby affecting the personalized recommendations that are provided to the individual user 10. With some embodiments, the effect on the ranking score of an interaction with a web document taken by a second or third-level connection may be less than the effect of an interaction with a web document by a user's first level connections. For instance, in some embodiments, different weights for different interactions may be based on the closeness of the relationship between a particular user and another user in the user's extended network.

In addition to establishing connections with other users, a social network user may indicate that he is an employee of a particular company, is a former employee of a company, or simply has an interest in a particular company (e.g., by subscribing to "follow" the company). This relationship is indicated in FIG. 1 by the group of users with label, "Company", and reference number 14. This information may be explicitly provided, for example, by the social network service prompting for and receiving employment history information for a user, such that the information forms part of the user's social network profile. Similarly, a user may affirmatively request to become part of an administered group for his company, where the group is hosted by the social network service and serves as an online forum for the exchange of information between all employees of the company. When a user has indicated that he is a current or former employee of a company, or follows a particular company, the interactions with web documents by the employees for the company can impact the ranking scores for the clusters of web documents, and ultimately impact which clusters or web documents are recommended to the individual user. For example, if several employees of a company of which the user is also an employee are reading web documents pertaining to a particular news event or story, then this information can be used to infer that the individual user may also be interested in the story. As such, the ranking score for the cluster of documents to which the story relates may be increased when many employees of a company of which the user is also an employee are viewing, or otherwise interacting with those web documents associated with the particular cluster.

Another type of relationship a user may have with another user involves common membership in a group. This is illustrated in FIG. 1 by the users labeled "Group" with reference number 16. For instance, a group may be an online forum where users with similar interests can exchange information and engage in discussions about topics of interest that are generally related to the group. Groups may be self-administered, such that any user of the social network service can establish a group, and become the group's administrator. Alternatively, a group may be administered by an operator or administrator of the social network service. A group may be a public group and open to all users of the social network service, or a private group requiring an invitation or a confirmation of some information prior to being granted membership in the group. For example, registration with a group for the alumni of a particular school may require that each user confirm his matriculation with and/or graduation from the particular school prior to being granted access to the alumni group. As with connections and company groups, the interactions that members of a group have with various web documents may impact the ranking score for a cluster of documents for a particular user, thereby impacting the content that is ultimately recommended to the user.

A final type of relationship illustrated in FIG. 1 may involve being related to others who have subscribed to the same topic of interest. For example, with some embodiments, a social network service may allow users to subscribe to content associated with particular topics. For example, these topics may be associated with what are referred to as professional interest centers 18. Consistent with some embodiments, a professional interest center is similar to a group, but is maintained or administered by a select user or group of users who are deemed to be experts on a particular topic. These experts are then responsible for curating (e.g., selecting and/or authoring) the content that is published in connection with their particular professional interest center. A user may subscribe to a particular professional interest center to receive notifications of when new content is published and shared. As such, the interactions that other users who subscribe to the same professional interest centers have with various web documents can be used as a measure of the likelihood that another user who also subscribes to the professional interest center will have an interest in the content.

In addition to the specific relationship types illustrated in FIG. 1, the relevance to a user of a particular item of web content may be determined based on a variety of other data as well, to include profile data, data derived from analyzing and tracking a user's interactions with the social network service or a third party service, and other data. For instance, with some embodiments, certain keywords used in a user's profile to describe some aspect of his experience, or interests, may be utilized in determining the likelihood that an item of web content will be of interest to the user. Similarly, if a user performs a keyword search, this keyword may be used to identify web-based content of potential interest to the user. In addition, such profile information as the industry a user belongs to, or the location where the user lives, may be utilized to assess the likelihood that a web-document will be of interest to the user. If a user has attended a certain event, as evidenced by information obtained via the social network service, or via a third-party data source, such information may be useful in determining the relevance to the user of certain web-based content. A user's reading history (e.g., which books a user has read, or which articles or document clusters the user tends to read from) may be used to assess the relevance of an item of web content to the user. For instance, if several users who have read book A, have selected to read web documents clustered around topic A, then the social network service may recommend documents from a cluster around topic A to those users who have read book A. Similarly, if users share or comment on a certain article, the content those users consume may be recommended to others who share or comment on the same article.

Figure 2:
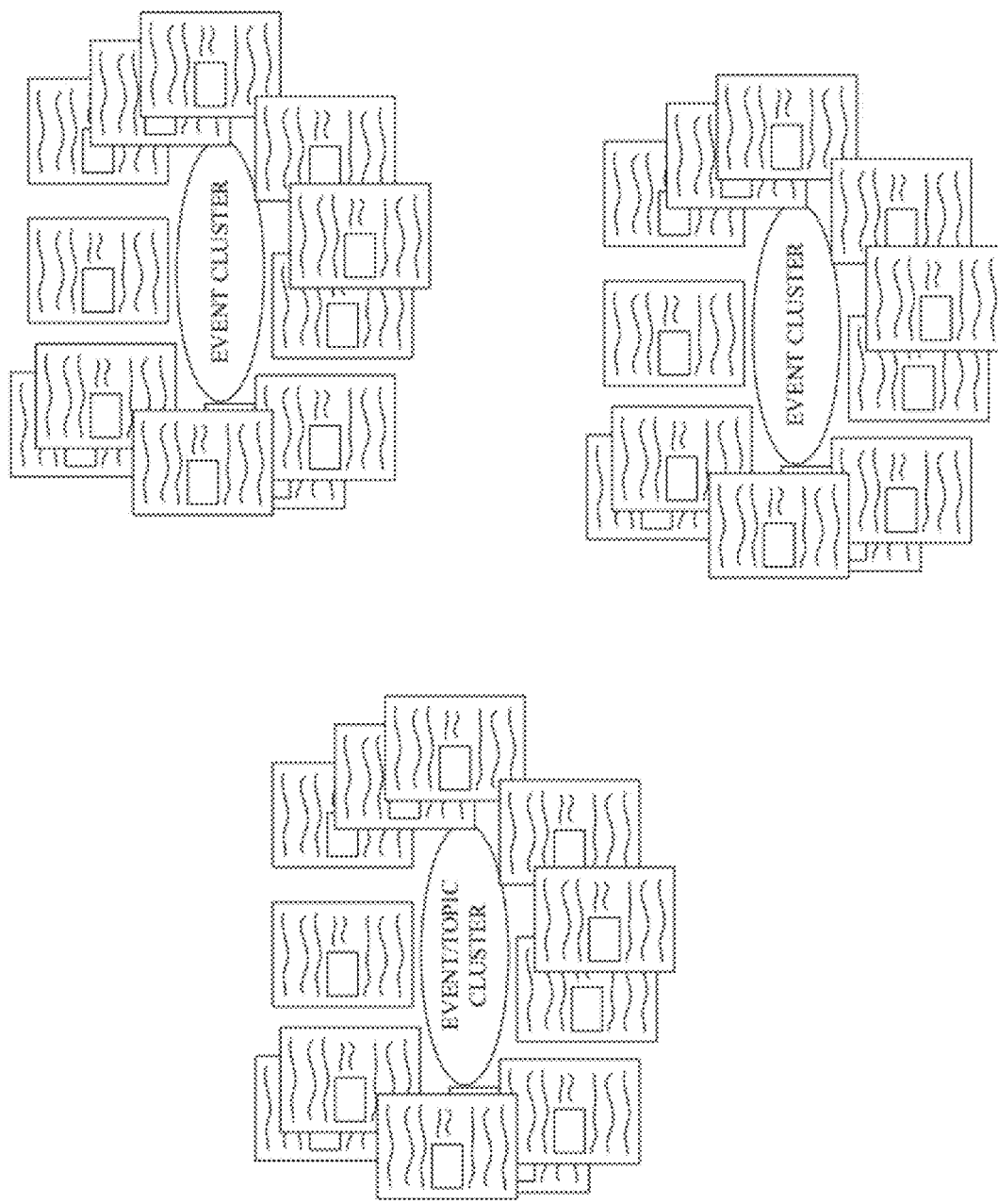
FIG. 2 illustrates the concept of a cluster of web documents for use with some embodiments of the invention.

FIG. 2 illustrates the concept of a cluster of web documents for use with some embodiments of the invention. As illustrated in FIG. 2, three different clusters 20, 22 and 24 of web documents are shown. Each cluster is representative of an individual topic, news event, or news story, such that all web documents in a particular cluster have been determined to be about the topic, news story or event. In general, the documents are clustered by analyzing the textual content of the individual documents to find similarities between the documents. Consistent with various embodiments, any one of several well-known document clustering techniques may be used to generate the individual clusters of web documents. Consistent with some embodiments, the clustering algorithm that is used to analyze the web documents and assign the web documents to the individual clusters may operate continuously in the background, so as to analyze and assign incoming web documents in real time. Additionally, the clustering algorithms may identify and/or suggest new topics, or news events, based on analysis of the text of the web documents. This is particularly important for clustering news stories and events that are occurring in real time as it allows the system to rapidly identify upwardly trending topics or news events.

Figure 3:
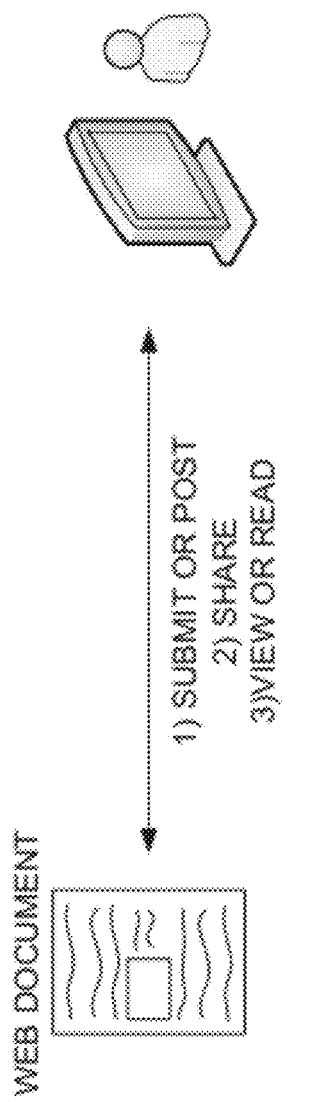
FIG. 3 illustrates an example of the various interactions that a social network user may have with a web document, consistent with some embodiments of the invention.

FIG. 3 illustrates an example of the various interactions that a member may have with a web document, consistent with some embodiments of the invention. For instance, consistent with some embodiments, a user may submit or post a web document to the social network service or to a third-party service, view or read a web document via the social network service or a third-party service, and/or share a web document with another user, group, or company via the social network service or a third-party service. Similarly, a user may comment on an article within a cluster, "like" an article, or recommend an article within a cluster. With some embodiments, an activity detection module continuously operates to detect the interactions that each individual user takes with respect to a particular web document. Accordingly, the detected interactions are recorded, for example, by storing activity data in an appropriate database table. As described in greater detail below, the impact on the overall ranking score that each interaction has may vary by the type of interaction, as well as by the context of the interaction. For instance, with some embodiments, each type of interaction may result in a score being allocated to a web document for a particular user, such that the ranking score for a cluster of web documents is essentially equivalent to the sum of all scores for the web documents allocated to particular cluster of web documents. However, the score allocated to a web document for one type of interaction (e.g., sharing a web document) may differ from the score for another interaction (e.g., posting the document to a particular group).

Figure 4:
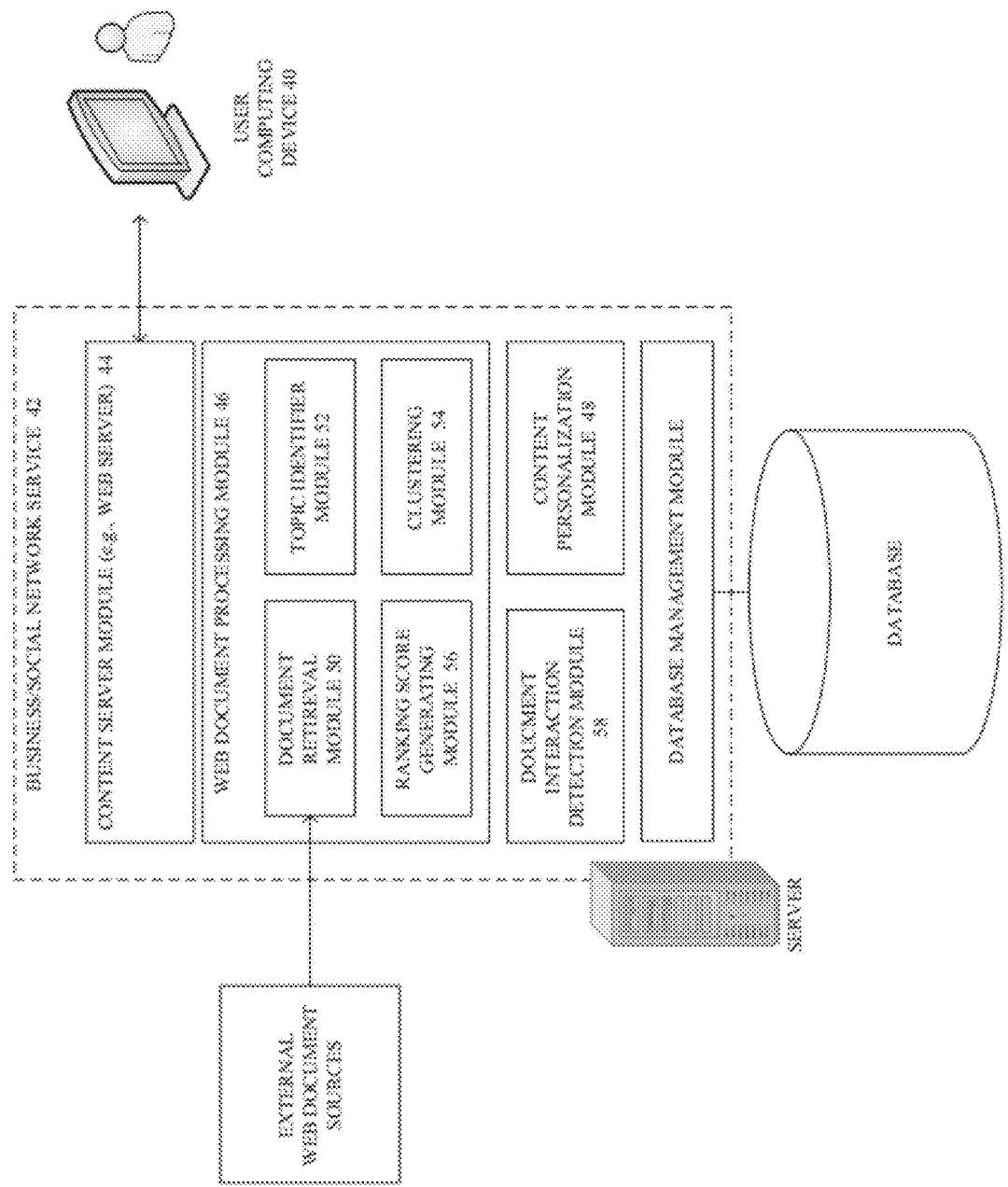
FIG. 4 illustrates a functional block diagram of some of the various software and/or hardware modules for use in carrying out some of the methodologies described herein, consistent with some embodiments of the invention.

FIG. 4 illustrates a functional block diagram of some of the various software and/or hardware modules for use in carrying out some of the methodologies described herein, consistent with some embodiments of the invention. As described in greater detail below, the various modules shown in FIG. 4 represent collections of executable software instructions, which, when executed by a processor, facilitate various functions or operations. As such, at least with some embodiments, the modules represent processor-implemented modules for carrying out the various methodologies described herein.

Consistent with some embodiments of the invention, a user utilizes a computing device 40 to access the social network service 42 over a data network, such as the Internet. As such, the social network service 42 includes a content server module (e.g., a web server) 44 for receiving and processing requests for content. The content server module 44 operates in conjunction with a web document processing module 46 and a content personalization module 48 to present a user with personalized content. More specifically, the content personalization module 48 facilitates the presentation to a user of recommendations regarding web documents and/or clusters of web documents that the user is likely to find of interest, based on an analysis of how the user, and persons with whom the user is related, have interacted with various web documents.

The web document processing module 46 includes a document retrieval module 50, a topic identifier module 52, a clustering module 54 and a ranking score generating module 56. With some embodiments, the document retrieval module may automatically request and receive web documents from one or more external services (e.g., content partners). Additionally, the document retrieval module 50 may fetch or retrieve documents in real time as those documents are submitted to the social network service by users, or submitted or shared by users on other social networking services, such as Twitter®, or Facebook®. For instance, when a user shares or posts a URI of a particular document via the social network service, the document retrieval module 50 may request the web document from a content source by its URI. Regardless of how received, the web document processing module 46 includes a topic identifier module 52 and a clustering module 54 that process documents when received. Consistent with some embodiments, the topic identifier module 52 processes received web documents to identify topics with which the web document might be related. Any number of known algorithms for identifying topics in textual content may be utilized. For example, the topic identifier module 52 may analyze the text of the web document and form topic vectors based on the words found within the text. With some embodiments, the result of the analysis is a set of topics, and a confidence number assigned to each web document indicating a measure of the confidence that the particular web document relates to a particular topic.

Similarly, the clustering module 54 processes web documents to generate the clusters of web documents, where topics identified by the topic identifier module 52 form the basis of each cluster. For instance, the clusters of web documents may be automatically generated, after topics are automatically selected to be the basis of the individual clusters. For instance, a topic may be a particular news event, such as, the inauguration of the U.S. President. The document clustering module 54 will then analyze the text of each web document to assess whether the web document is about the particular topic associated with the various clusters. In some instances, the various topics which form the basis of each cluster may be automatically suggested and then manually selected. However, in some embodiments, the entire process is automated.

Consistent with some embodiments of the invention, a document interaction detection module 58 detects interactions with web documents. For instance, each time a user of the social network takes any one of the actions specified and described in FIG. 3, the interaction is detected and the appropriate database tables are updated to reflect the interaction. Accordingly, the ranking score generating module 58 analyzes the data representing the user interactions over time, and generates a ranking score for each cluster of documents, for each user, based at least in part on how the user, and how the persons with whom the user is related, has interacted with the various web documents. When a user, or more precisely, a user's computing device, requests content from the social network service 42, the content personalization module may populate a portion of the resulting user interface display with one or more recommendations relating to web documents, or one or more clusters of web documents, that are deemed to have the highest ranking score for that particular user.

Figure 5:
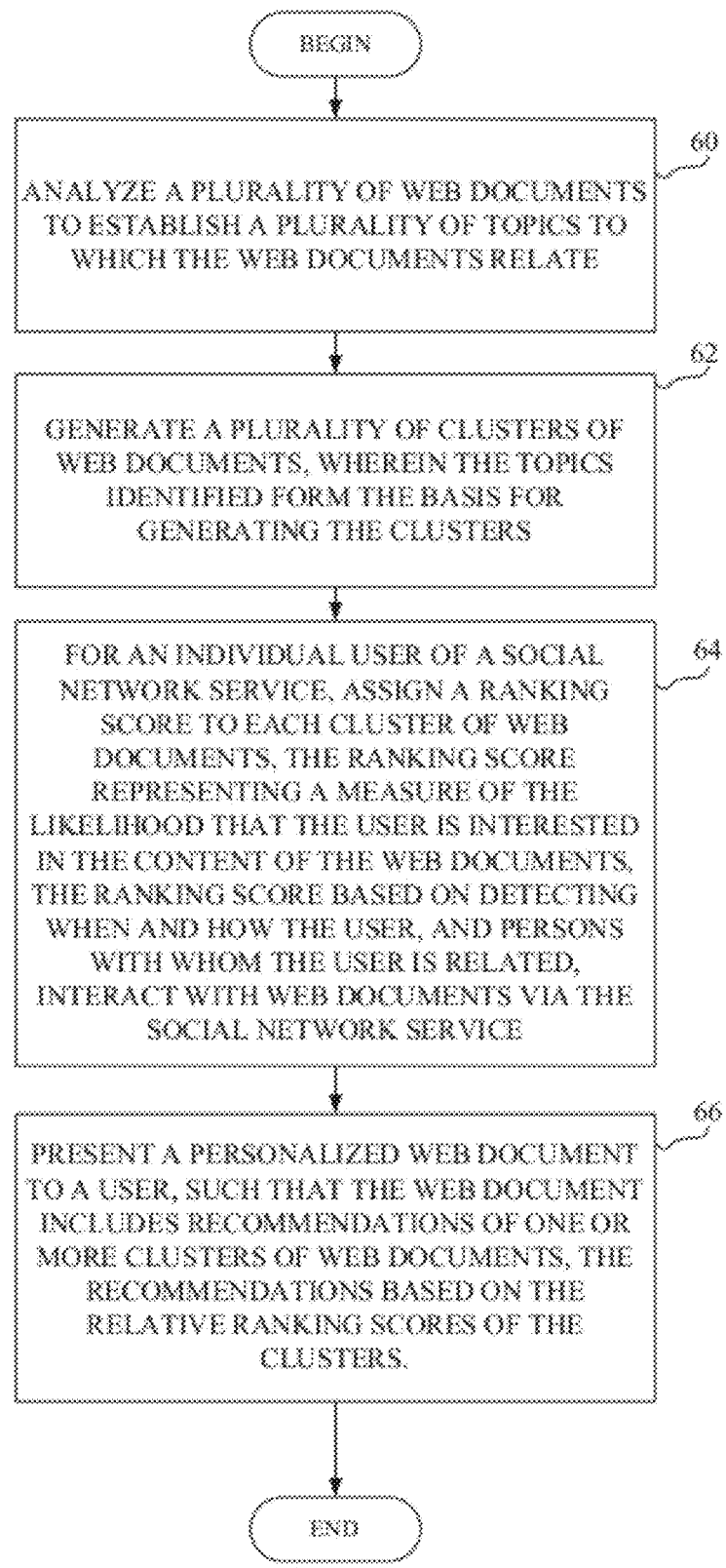
FIG. 5 illustrates a method, consistent with some embodiments of the invention, for processing web content items and presenting the web content items to an individual user of a social network service in a personalized manner.

FIG. 5 illustrates a method, consistent with some embodiments of the invention, for processing web content items and presenting the web content items to an individual user of a social network service in a personalized manner. The method begins at operation 60 when a plurality of web documents are analyzed to identify a plurality of topics to which the web documents relate. Next, at method operation 62, a plurality of clusters of web documents are generated, where the topics identified in operation 60 form the basis for generating the clusters. Next, at method operation 64, for an individual user, ranking scores for each cluster of documents are generated. The ranking scores represent a measure of the likelihood that the user would be interested in the content of the web documents assigned to a cluster. The ranking scores are based on detecting interactions with web documents by the user, and by persons with whom the user is related, as defined by the social network service. Finally, at method operation 66, a personalized web document is presented to a user of the social network service. The personalized web document includes one or more recommendations to a web document, or a cluster of web documents, based on the relative ranking score of the clusters, for that particular user.

Figure 6:
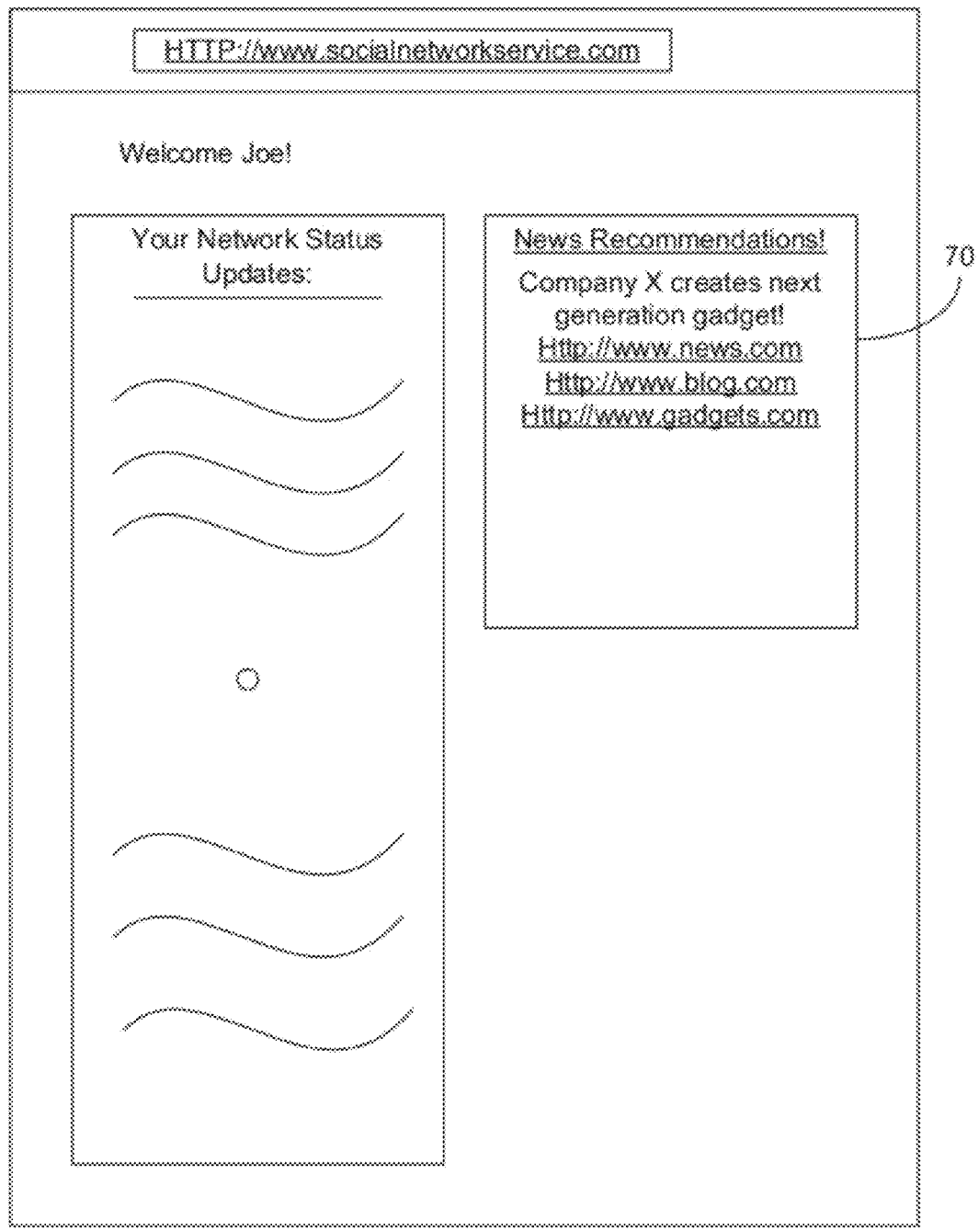
FIG. 6 illustrates an example of a user interface representing a personalized web document that includes personalized content recommendations to a user of a social network service.

FIG. 6 illustrates an example of a user interface representing a personalized web document that includes personalized content recommendations to a user of a social network service. For instance, in some embodiments, the personalized content may appear as a separate module or portion of the UI, as represented by the box in FIG. 6 with reference number 70. In this example, the personalized content involves recommendations with respect to news stories that are of potential interest to the user. As illustrated in FIG. 6, the "News Recommendation" module shows a summary of the particular cluster topic, as well as several links to various documents that have been assigned to the cluster. In some embodiments, multiple clusters may be recommended with links to documents from each cluster. With some embodiments, the clusters are selected based on their respective ranking scores. However, in other embodiments, a wide variety of other factors may also be considered, such as the context or web page in which the recommendations are to appear. For instance, if the web page is a company specific page, then documents associated with the company may be given preference, and so on.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 7:
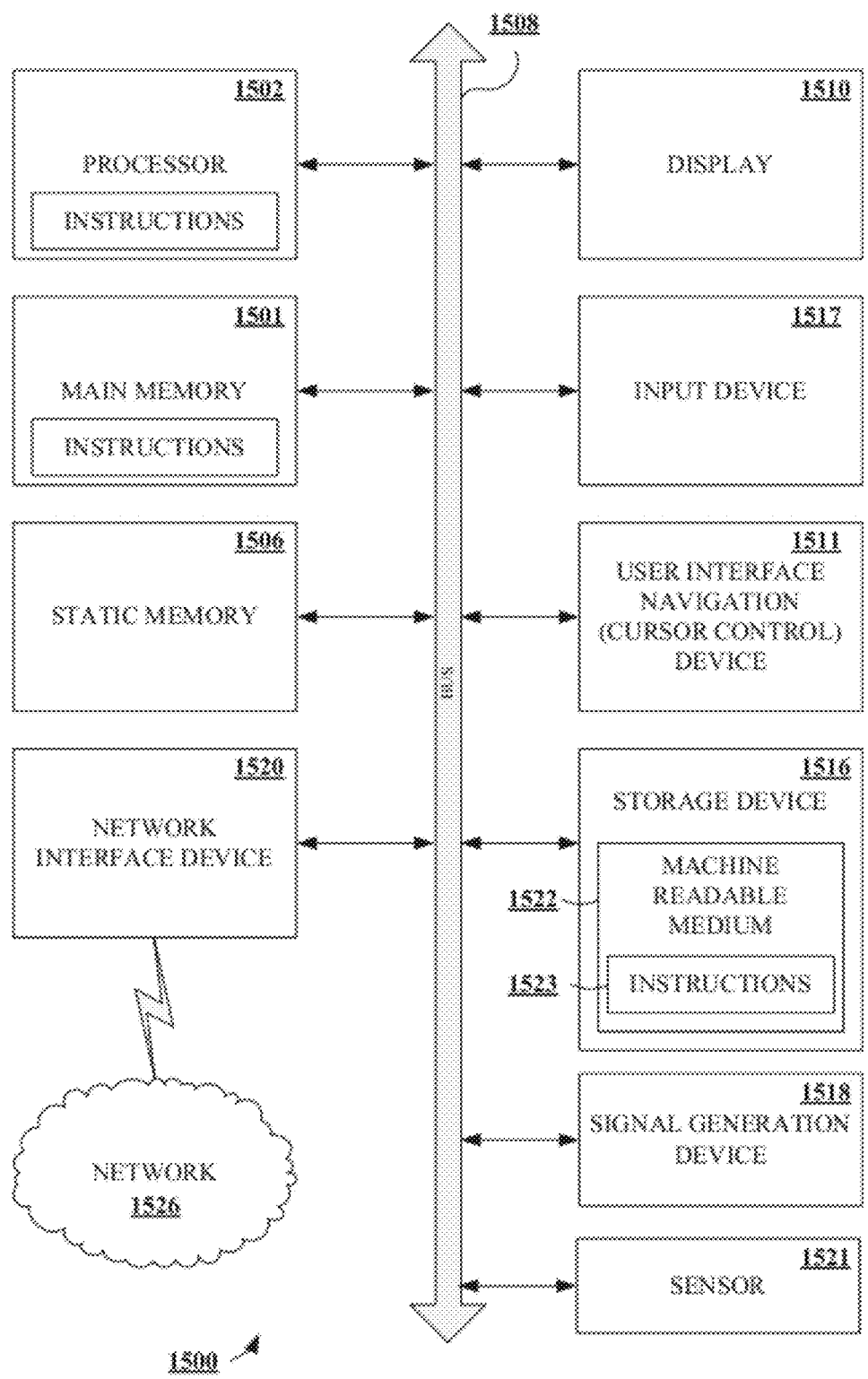
FIG. 7 is a block diagram of a machine in the form of a computer within which a set of instructions, for causing the machine to perform any one or more of the methodologies discussed herein, may be executed.

FIG. 7 is a block diagram of a machine in the form of a computer within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A computer-implemented method comprising:
analyzing a plurality of web documents to establish a plurality of topics to which the web documents relate, each topic representing a basis for generating a cluster of web documents;
generating a plurality of clusters of web documents by performing a clustering operation to assign each analyzed web document to a cluster corresponding to a topic of the plurality of topics;
for an individual member of a social network service, assigning a ranking score to each cluster of web documents, the ranking score representing a measure of likelihood that the individual member will be interested in a web document assigned to the respective cluster, the ranking score derived, in whole or in part, by monitoring for and detecting interactions with web documents by other members with whom the individual member has established a direct connection via the social network service, the establishment of a direct connection between the individual member and another member requiring authorization by both the individual member and the other member; and
presenting a personalized web document to the individual member, the personalized web document containing information regarding a web document selected from the cluster of web documents having the highest ranking score for the individual member.

2. The computer-implemented method of claim 1, wherein the ranking score for a particular cluster of web documents is derived by monitoring for and detecting interactions with web documents assigned to the particular cluster, at least one detectable interaction including the individual member, or another member with whom the individual member has established a direct connection via the social network service, viewing or reading a web document that is assigned to the particular cluster.

3. The computer-implemented method of claim 1, wherein the ranking score for a particular cluster of web documents is derived by monitoring for and detecting interactions with web documents assigned to the particular cluster, at least one detectable interaction including the individual member, or a member with whom the individual member has established a direct connection via the social network service, sharing the web document assigned to the particular cluster with another member of the social network service.

4. The computer-implemented method of claim 1, wherein the ranking score for a particular cluster of web documents is derived by monitoring for and detecting interactions with web documents assigned to the particular cluster, at least one detectable interaction including the individual member, or a member with whom the individual member has established a direct connection via the social network service, recommending a web document assigned to the particular cluster to another member of the social network service.

5. The computer-implemented method of claim 1, wherein the ranking score for a particular cluster of web documents is derived by monitoring for and detecting interactions with web documents assigned to the particular cluster, at least one detectable interaction including the individual member, or a member with whom the individual member has established a direct connection via the social network service, submitting a web document for consideration by another member or group of members.

6. The computer-implemented method of claim 1, wherein the ranking score for a particular cluster of web documents is derived as a sum of sub-scores assigned to each individual web document that is assigned to the particular cluster, the sub-score for an individual web document derived as a sum of scores assigned to the web document based on the detecting of interactions with the web document by the individual member, or by a member with whom the individual member has established a direct connection via the social network service.

7. The computer-implemented method of claim 1, wherein the ranking score for a particular cluster of web documents is derived in part by analyzing biographical information included in the individual member's profile to determine that the individual member previously had, or currently has, a job title that has been determined to indicate a likelihood that the individual member would be interested in the topic for the cluster.

8. The computer-implemented method of claim 1, wherein the ranking score for a particular cluster of web documents is derived in part by analyzing biographical information included in the individual member's profile to determine that the individual member has obtained an education degree, or professional certification, that has been determined to indicate a likelihood that the individual member would be interested in the topic for the cluster.

9. The computer-implemented method of claim 1, wherein monitoring for and detecting interactions with web documents includes monitoring for and detecting a plurality of different types of interactions, wherein each individual type of interaction represents a different measure of the likelihood that the individual member will be interested in a particular web document.

10. The computer-implemented method of claim 1, wherein presenting a personalized web document to the individual member includes presenting a personalized web document containing one or more links to web documents selected from the cluster of web documents having the highest ranking score for the individual member.

11. A social network service operating on one or more servers, at least one server comprising a memory storing instructions that are executable by a processor to cause the social network service to:

analyze a plurality of web documents to establish a plurality of topics to which the web documents relate, each topic representing a basis for generating a cluster of web documents;

generate a plurality of clusters of web documents by performing a clustering operation to assign each analyzed web document to a cluster corresponding to a topic of the plurality of topics;

for an individual member of the social network service, assign a ranking score to each cluster of web documents, the ranking score representing a measure of likelihood that the individual member will be interested in a web document assigned to the respective cluster, the ranking score derived, in whole or in part, by monitoring for and detecting interactions with web documents by other members who, based on their respective social network member profiles, are employed at the same company as the individual member; and present a personalized web document to the individual member, the personalized web document containing information regarding a web document selected from the cluster of web documents having the highest ranking score for the individual member.

12. The social network service of claim 11, wherein the ranking score for a particular cluster of web documents is derived by monitoring for and detecting interactions with web documents assigned to the particular cluster, at least one detectable interaction including another member who is employed at the same company as the individual member viewing or reading a web document that is assigned to the particular cluster.

13. The social network service of claim 11, wherein the ranking score for a particular cluster of web documents is derived by monitoring for and detecting interactions with web documents assigned to the particular cluster, at least one detectable interaction including a member who is employed at the same company as the individual member sharing the web document assigned to the particular cluster with another member of the social network service.

14. The social network service of claim 11, wherein the ranking score for a particular cluster of web documents is derived by monitoring for and detecting interactions with web documents assigned to the particular cluster, at least one detectable interaction including a member who is employed at the same company as the individual member recommending a web document assigned to the particular cluster to another member of the social network service.

15. The social network service of claim 11, wherein the ranking score for a particular cluster of web documents is derived by monitoring for and detecting interactions with web documents assigned to the particular cluster, at least one detectable interaction including a member who is employed at the same company as the individual member submitting a web document for consideration by another member or group of members.

16. The social network service of claim 11, wherein the ranking score for a particular cluster of web documents is derived as a sum of sub-scores assigned to each individual web document that is assigned to the particular cluster, the sub-score for an individual web document derived as a sum of scores assigned to the web document based on the detecting of interactions with the web document by a member who is employed at the same company as the individual member.

17. The social network service of claim 11, wherein the ranking score for a particular cluster of web documents is derived in part by analyzing biographical information included in the individual member's profile to determine that the individual member previously had or currently has, a job title that has been determined to indicate a likelihood that the individual member would be interested in the topic for the cluster.

18. The social network service of claim 11, wherein the ranking score for a particular cluster of web documents is derived in part by analyzing biographical information included in the individual member's profile to determine that the individual member has obtained an education degree, or professional certification, that has been determined to indicate a likelihood that the individual member would be interested in the topic for the cluster.

19. The social network service of claim 11, wherein monitoring for and detecting interactions with web documents includes monitoring for and detecting a plurality of different types of interactions, wherein the individual types of interactions represent different measures of likelihood of interest.

20. The social network service of claim 11, wherein presenting a personalized web document to the individual member includes presenting a personalized web document containing one or more links to web documents selected from the Cluster of Web documents having the highest ranking score for the individual member.

21. A computer-implemented method comprising:
analyzing a plurality of web documents to establish a plurality of topics to which the web documents relate, each topic representing a basis for generating a cluster of web documents;
generating a plurality of clusters of web documents by performing a clustering operation to assign each analyzed web document to a cluster corresponding to a topic of the plurality of topics;
for an individual member of a social network service, assigning a ranking score to each cluster of web documents, the ranking score representing a measure of likelihood that the individual member will be interested in a web document assigned to the respective cluster, the ranking score derived, in part, by monitoring for and detecting interactions with web documents by other members of the social network service who have indicated in their member profiles having the same job title as the individual member; and
presenting a personalized web document to the individual member, the personalized web document containing information regarding a web document selected from the cluster of web documents having the highest ranking score for the individual member.

22. A computer-implemented method comprising;
analyzing a plurality of web documents to establish, a plurality of news events to which the web documents relate, each topic representing a basis for generating a cluster of web documents;
generating a plurality of clusters of web documents by performing a clustering operation to assign each analyzed web document to a cluster corresponding to a news event of the plurality of news events;
for an individual member of a social network service, assigning a ranking score to each cluster of web documents, the ranking score representing a measure of likelihood that the individual member will be interested in a web document assigned to the respective cluster, the ranking score derived, in part, by monitoring for and detecting interactions with web documents by other members of the social network service who have indicated in their member profiles having the same education degree as the individual member; and
presenting a personalized web document to the individual member, the personalized web document containing information regarding a web document selected from the cluster of web documents having the highest ranking score for the individual member.

23. A computer-implemented method comprising:
analyzing a plurality of web documents to establish a plurality of news events to which the web documents relate, each news event representing a basis for generating a cluster of web documents;
generating a plurality of clusters of web documents by performing a clustering operation to assign each analyzed web document to a cluster corresponding to a news event of the plurality of news events;
for an individual member of a social network service, assigning a ranking score to each cluster of web documents, the ranking score representing, a measure of likelihood that the individual member will be interested in a web document assigned to the respective cluster, the ranking score derived, in part, by monitoring for and detecting interactions with web documents by other members of the social network service that the individual member is following via the social network service; and
presenting a personalized web document to the individual member, the personalized web document containing information regarding a web document selected from the cluster of web documents having the highest ranking score for the individual member.

\* \* \* \* \*

UNITED STATES PATENT AND TRADEMARK OFFICE
CERTIFICATE OF CORRECTION

| | |
|---|---|
| PATENT NO. | : 8,949,239 B2 |
| APPLICATION NO. | : 13/010663 |
| DATED | : February 3, 2015 |
| INVENTOR(S) | : Ruffner et al. |

It is certified that error appears in the above-identified patent and that said Letters Patent is hereby corrected as shown below:

In the claims

In column 14, line 56, in Claim 17, delete "had" and insert --had,--, therefor

In column 15, line 10, in Claim 20, delete "Cluster of Web" and insert --cluster of web--, therefor In column 15, line 36, in Claim 22, delete "comprising;" and insert --comprising:--, therefor In column 15, line 37, in Claim 22, delete "establish," and insert --establish--, therefor In column 16, line 29, in Claim 23, delete "representing," and insert --representing--, therefor Signed and Sealed this
Third Day of November, 2015

Michelle K. Lee
*Director of the United States Patent and Trademark Office*